(12) United States Patent
Bokor et al.

(10) Patent No.: US 9,568,993 B2
(45) Date of Patent: Feb. 14, 2017

(54) AUTOMATED AVATAR MOOD EFFECTS IN A VIRTUAL WORLD (75) Inventors: Brian R. Bokor, Raleigh, NC (US); Andrew B. Smith, Morrisville, NC (US); Steven K. Speicher, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 12/330,829

(22) Filed: Dec. 9, 2008

(65) Prior Publication Data

US 2010/0146407 A1    Jun. 10, 2010

(51) Int. Cl.
G06F 3/048 (2013.01)
G06F 3/01 (2006.01)
G06F 3/0481 (2013.01)
H04L 12/58 (2006.01)

(52) U.S. Cl.
CPC ........... G06F 3/011 (2013.01); G06F 3/04815 (2013.01); H04L 12/581 (2013.01)

(58) Field of Classification Search
CPC ............................. G06F 3/0481; H04L 12/581
USPC ...................... 709/204; 715/757, 758; 463/42
See application file for complete search history.

(56) References Cited

U.S. PATENT DOCUMENTS

| | | | |
|---|---|---|---|
| 5,802,296 A | 9/1998 | Morse et al. | |
| 5,880,731 A | 3/1999 | Liles et al. | |
| 5,926,179 A | 7/1999 | Matsuda et al. | |
| 6,064,383 A | 5/2000 | Skelly et al. | |
| 6,229,533 B1 | 5/2001 | Farmer et al. | |
| 6,285,380 B1 | 9/2001 | Perlin et al. | |
| 6,329,986 B1 | 12/2001 | Cheng | |
| 6,359,622 B1 | 3/2002 | Hayes-Roth | |
| 6,563,503 B1 | 5/2003 | Comair et al. | |
| 7,065,711 B2 * | 6/2006 | Hata et al. | 715/758 |
| 7,386,799 B1 | 6/2008 | Clanton et al. | |
| 7,468,729 B1 | 12/2008 | Levinson | |
| 2002/0008716 A1 | 1/2002 | Colburn et al. | |

(Continued)

FOREIGN PATENT DOCUMENTS

WO    9939281 A2    8/1999

OTHER PUBLICATIONS

How to use XML Notepad to create an XML document, Microsoft, Mar. 22, 2006, obtained via Internet at http://support.microsoft.com/kb/296560.*

(Continued)

*Primary Examiner* — Haoshian Shih
(74) *Attorney, Agent, or Firm* — Moore & Van Allen PLLC (57) ABSTRACT A method for automated avatar mood effects in a virtual world may include detecting occurrence of a mood changing condition relatable to a user's avatar. The method may also include determining an avatar mood effect from a plurality of predefined avatar mood effects to be applied to the user's avatar in the virtual world based on the detected mood changing condition. The method may further include automatically applying the avatar mood effect to the user's avatar in the virtual world in response to detecting occurrence of the mood changing condition and determining an applicable avatar mood effect based on the detected mood changing condition and presenting the automatically applied avatar mood effect in association with the user's avatar in the virtual world.

20 Claims, 8 Drawing Sheets

(56) References Cited

U.S. PATENT DOCUMENTS

| | | | |
|---|---|---|---|
| 2003/0126031 A1* | 7/2003 | Asami | G06Q 30/0613 705/26.41 |
| 2004/0001086 A1* | 1/2004 | Brown et al. | 345/744 |
| 2004/0225640 A1 | 11/2004 | Brown et al. | |
| 2005/0143138 A1 | 6/2005 | Lee et al. | |
| 2005/0183025 A1* | 8/2005 | Kumar | 715/764 |
| 2005/0223328 A1 | 10/2005 | Ashtekar et al. | |
| 2006/0248461 A1 | 11/2006 | Yamada et al. | |
| 2007/0075993 A1 | 4/2007 | Nakanishi et al. | |
| 2007/0111795 A1 | 5/2007 | Choi et al. | |
| 2007/0113181 A1* | 5/2007 | Blattner et al. | 715/706 |
| 2007/0136068 A1 | 6/2007 | Horvitz | |
| 2007/0218987 A1* | 9/2007 | Van Luchene et al. | 463/30 |
| 2008/0059570 A1 | 3/2008 | Bill | |
| 2008/0081701 A1 | 4/2008 | Shuster | |
| 2008/0091692 A1 | 4/2008 | Keith et al. | |
| 2008/0120558 A1 | 5/2008 | Nathan et al. | |
| 2009/0069084 A1 | 3/2009 | Reece et al. | |
| 2009/0079813 A1 | 3/2009 | Hildreth | |
| 2009/0094517 A1* | 4/2009 | Brody | G06Q 30/02 715/706 |
| 2009/0144173 A1 | 6/2009 | Mo et al. | |
| 2009/0144639 A1* | 6/2009 | Nims et al. | 715/757 |
| 2009/0147008 A1 | 6/2009 | Do et al. | |
| 2009/0158170 A1 | 6/2009 | Narayanan | |
| 2009/0177976 A1* | 7/2009 | Bokor et al. | 715/753 |
| 2009/0209335 A1 | 8/2009 | Pearce | |
| 2009/0300525 A1 | 12/2009 | Jolliff et al. | |

OTHER PUBLICATIONS

Robbins et al., Second Life for Dummies, Jan. 15, 2008, pp. 106-107, 256-258.*

Blizzard Entertainment, "World of Warcraft Getting Started", retrived on Nov. 4, 2004 from the Internet at <URL:http://web.archive.org/web/*/http://www.worldofwarcraft.com/info/basics/gettingstarted.html>, 2 pages.

USPTO; Non-Final Office Action for U.S. Appl. No. 11/971,508 dated Nov. 3, 2010, 22 Pages.

USPTO; Final Office Action for U.S. Appl. No. 11/971,508 dated Feb. 16, 2011, 26 Pages.

USPTO; Non-Final Office Action for U.S. Appl. No. 11/971,508 dated Jun. 6, 2011, 23 Pages.

USPTO; Final Office Action for U.S. Appl. No. 11/971,508 dated Oct. 24, 2011, 24 Pages.

USPTO; Non-Final Office Action for U.S. Appl. No. 11/971,508 dated May 9, 2012, 23 Pages.

USPTO; Final Office Action for U.S. Appl. No. 11/971,508 dated Sep. 12, 2012, 26 Pages.

USPTO; Examiner's Answer for U.S. Appl. No. 11/971,508 dated Mar. 15, 2013, 8 Pages.

USPTO; Decision on Appeal for U.S. Appl. No. 11/971,508 dated Oct. 1, 2015, 6 Pages.

* cited by examiner

AUTOMATED AVATAR MOOD EFFECTS IN A VIRTUAL WORLD

CROSS-REFERENCE TO RELATED APPLICATIONS

The present application is related to U.S. patent application Ser. No. 11/971,508, filed Jan. 9, 2008, entitled "Managing and Presenting Avatar Mood Effects in a Virtual World," which is assigned to the assignee as the present application and is incorporated herein in its entirety by reference.

BACKGROUND

The present invention relates to virtual worlds, such as simulations of the real-world or real-life, and the like, and more particularly to a method and system for automated avatar mood effects in a virtual world.

Computer based simulations are becoming more ubiquitous. Simulations may be used for training purposes, for entertainment, for commerce or for other purposes. Computer simulations such as Second Life or similar simulations present a virtual world which allows users or players to be represented by characters known as avatars. Second Life is an Internet-based virtual world launched in 2003 by Linden Research, Inc. A downloadable client program called the Second Life Viewer enables users, called "Residents", to interact with others in the virtual world through motional avatars. The virtual world basically simulates the real world or environment. The users or residents via their avatar can explore the virtual world, meet other users or residents, socialize, participate in individual and group activities, create and trade items (virtual property) and services from one another. The challenge with respect to such simulations or virtual worlds is to make them as realistic or as much like the real-world or real-life as possible. This increases the utility of such simulations as a training tool or enjoyment of the participants or users as an entertainment medium. Current virtual worlds enable only certain limited capabilities for simulating real-world interactions such as personalization of avatars based on clothing, facial features and physique. More engaging experiences, such as moods or emotions are typically not taken into account. For example, how moods are defined and affect personal features, such as dress, facial expressions or other features, and personal interactions is lacking. Second Life is a trademark of Linden Research, Inc. in the United States, other countries or both.

BRIEF SUMMARY

In accordance with an aspect of the present invention, a method for automated avatar mood effects in a virtual world may include detecting occurrence of a mood changing condition relatable to a user's avatar. The method may also include determining an avatar mood effect from a plurality of predefined avatar mood effects to be applied to the user's avatar in the virtual world based on the detected mood changing condition. The method may further include automatically applying the avatar mood effect to the user's avatar in the virtual world in response to detecting occurrence of the mood changing condition and determining an applicable avatar mood effect based on the detected mood changing condition and presenting the automatically applied avatar mood effect in association with the user's avatar in the virtual world, the automatically applied avatar mood effect being viewable by other user's of the virtual world In accordance with another aspect of the present invention, a system for automated avatar mood effects in a virtual world may include a processor and a module operable on the processor for automated avatar mood effects. The module comprises a unit to detect occurrence of a mood changing condition relatable to a user's avatar. The module may also include a unit to determine an avatar mood effect from a plurality of predefined avatar mood effects to be applied to the user's avatar in the virtual world based on the detected mood changing condition. The module may additionally include a unit to automatically apply the avatar mood effect to the user's avatar in the virtual world in response to detecting occurrence of the mood changing condition and determining an applicable avatar mood effect based on the detected mood changing condition. The module may further include a unit to present the automatically applied avatar mood effect in association with the user's avatar, the automatically applied avatar mood effect being viewable by other users of the virtual world.

In accordance with a further aspect of the present invention, a computer program product for automated avatar mood effects in a virtual world may include a computer usable medium having computer usable program code embodied therein. The computer usable medium may include computer usable program code configured to detect occurrence of a mood changing condition relatable to a user's avatar. The computer usable medium may also include computer usable program code configured to determine an avatar mood effect from a plurality of predefined avatar mood effects to be applied to the user's avatar in the virtual world based on the detected mood changing condition. The computer usable medium may additionally include computer usable program code configured to automatically apply the avatar mood effect to the user's avatar in the virtual world in response to detecting occurrence of the mood changing condition and determining an applicable avatar mood effect based on the detected mood changing condition. The computer useable medium may further include computer usable program code configured to present the automatically applied avatar mood effect in association with the user's avatar for viewing by other users of the virtual world.

Other aspects and features of the present invention, as defined solely by the claims, will become apparent to those ordinarily skilled in the art upon review of the following non-limited detailed description of the invention in conjunction with the accompanying figures.

DETAILED DESCRIPTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wire line, optical fiber cable, radio frequency (RF) or other means.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1A:
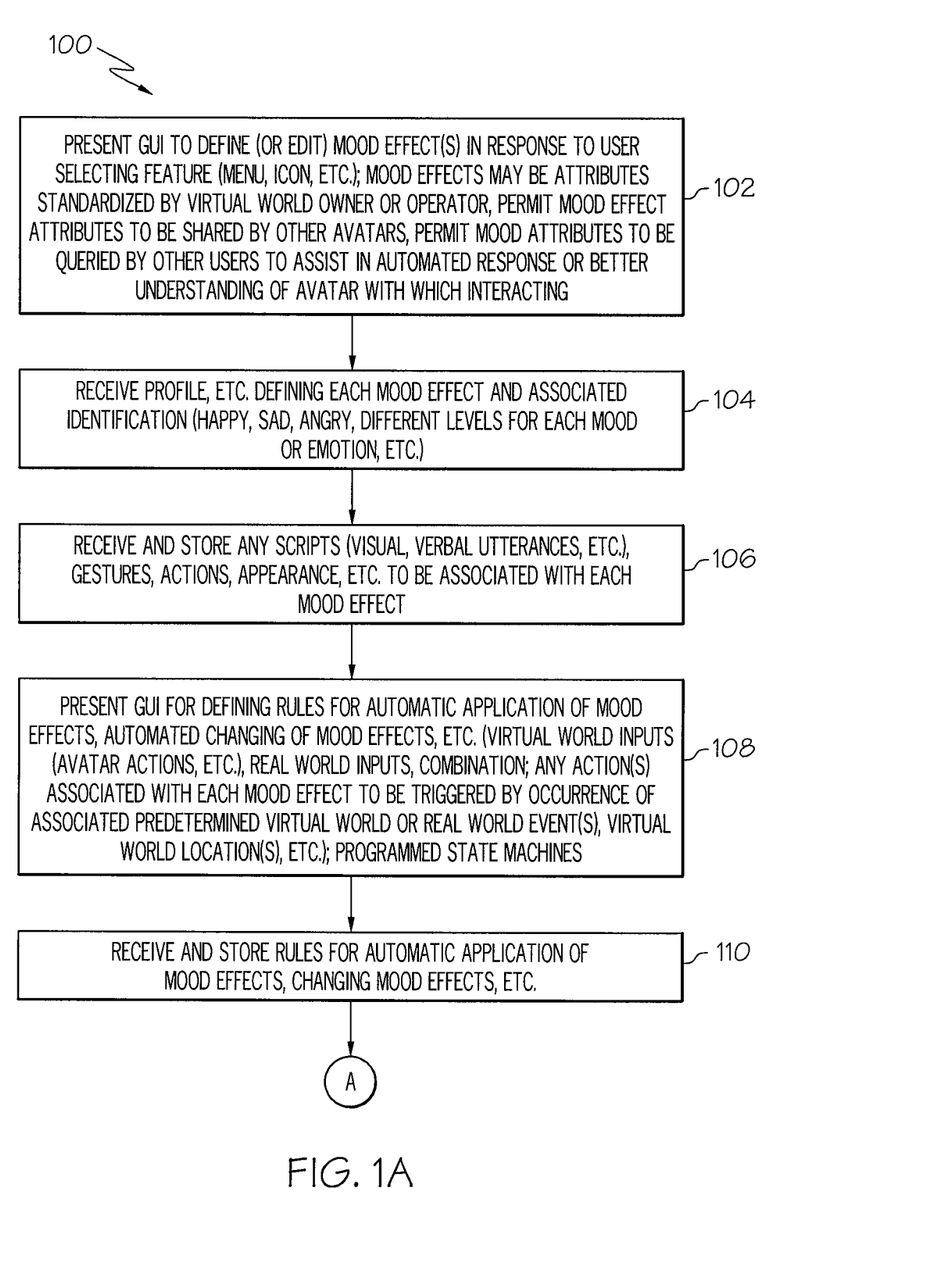
FIGS. 1A and 1B (collectively FIG. 1) are a flow chart of an example of a method for automated avatar mood effects in a virtual world in accordance with an embodiment of the present invention.
Figure 1B:
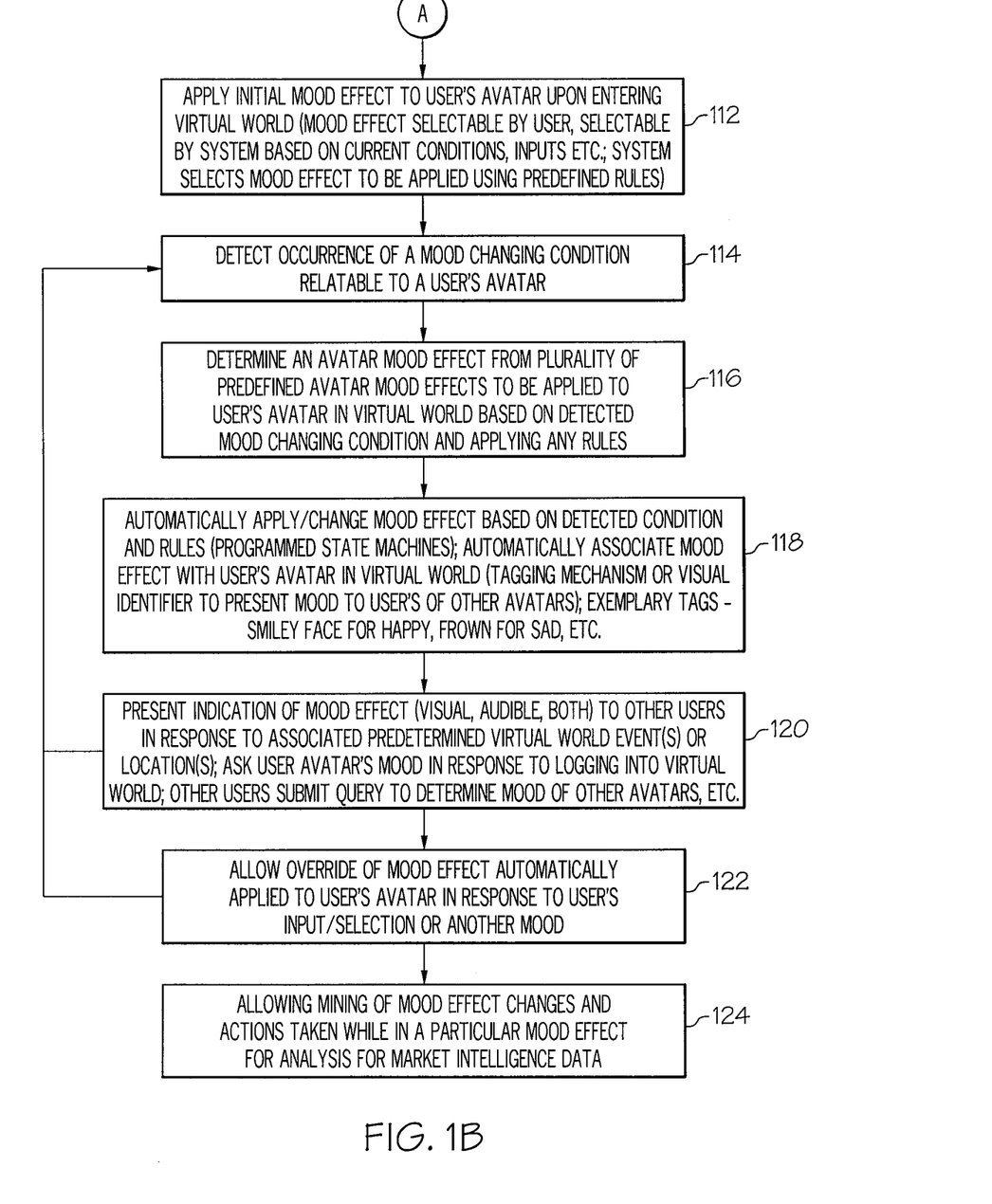

FIGS. 1A and 1B (collectively FIG. 1) are a flow chart of an example of a method 100 for automated avatar mood effects in a virtual world in accordance with an embodiment of the present invention. The terms mood, mood effects, emotions or similar terms may be used interchangeably herein to describe a state of mind, feeling, mood, emotion or the like of a user, a user's avatar in the virtual world or both, and to represent or convey this mood emotion, state of mind or the like to other users in the virtual world. In block 102, a graphical user interface (GUI) may be presented to define or edit a mood effect or mood effects. The mood effects GUI may be presented in response to a user selecting a feature, such as a menu, icon or other mechanism in a virtual world being presented on a display of the user's computer system, such as display 718 of computer system 706 in FIG. 7. The GUI may be presented by a user selecting or clicking-on the menu, icon or other mechanism using a computer pointing device or similar device.

Figure 2:
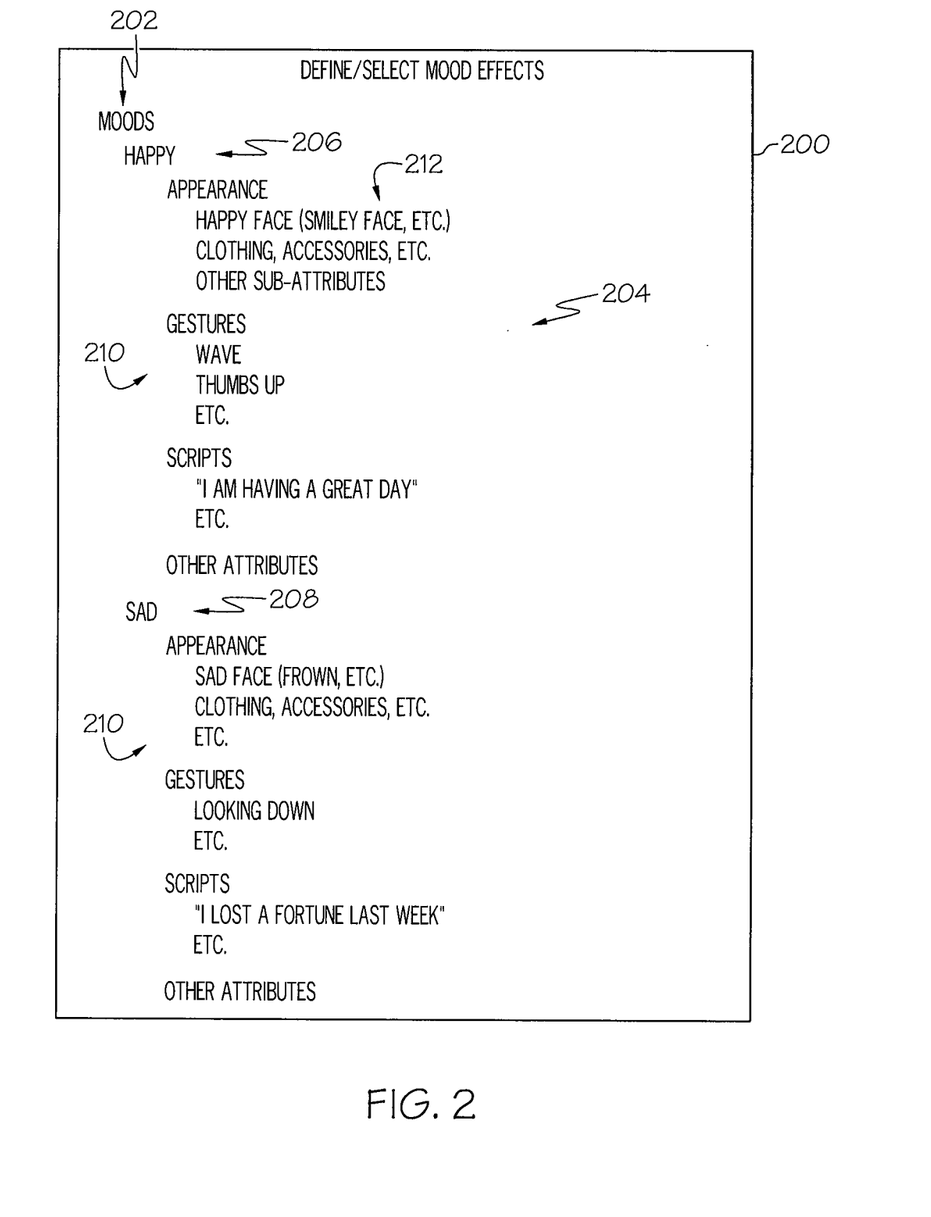
FIG. 2 is an example of a graphical user interface for defining, selecting or editing mood effects in a virtual world in accordance with an embodiment of the present invention.

Referring also to FIG. 2, FIG. 2 is an example of a GUI 200 for defining or editing mood effects in a virtual world in accordance with an embodiment of the present invention. As illustrated in FIG. 2, each mood 202 or mood effect may be defined as a profile 204, such as a "happy" profile 206 or a "sad" profile 208. Other mood effect profiles may include anger, embarrassment or any other human moods or emotions capable of being displayed or represented in the virtual world. Each profile 204 may include a plurality of attributes 210 and sub-attributes 212 that may be selected or entered by a user. Examples of attributes may include appearances, gestures, scripts or other attributes that may be associated or applied to a user's avatar similar to that described herein. Examples of appearances may include a happy face or smiley face, a sad face or frown, an angry face or other appearances or facial expressions that may convey a particular mood, mood effect or emotion to other participants in the virtual world. A happy or smiley face may be applied to the user's avatar corresponding to a happy mood 206 or a happy mood effect. A sad face or frown may be applied to the user's avatar corresponding to a sad mood 210 or sad mood effect. Other examples of appearance that may connote a particular mood or mood effect may include but is not necessarily limited to clothing worn by the user's avatar, accessories, such as jewelry or other items worn or associated with the avatar.

Examples of gesture attributes may include actions that may be carried out by a user's avatar in association with a particular mood or mood effect profile applied to an avatar. For instance a wave or thumbs up may be associated with a happy mood effect. Head lowered, shoulder slumped, crying or the like may be examples of gestures that may be associated with a sad mood effect. A particular action or gesture may be performed by a user's avatar while the mood effect corresponding with the particular gesture is associated with or applied to the user's avatar.

Examples of scripts may include visual or verbal utterances or other forms of communication that may be associated with an avatar to convey a mood effect. The script may be presented in the virtual world as a balloon containing text which is indicated as being spoken by the user's avatar similar to that illustrated in FIG. 5. Scripts may also be speech actually spoken by the user's avatar which may be heard by other participants or users of the virtual world via a speaker or speakers of a computer system, such as speaker 720 of computer system 706 of FIG. 7.

The profiles 204 may become extremely complex similar to human moods and emotions. Examples of more complex profiles may include "very happy", "best day of my life", "don't talk to me", "bad" or any other moods or emotions. The profiles may define certain actions based on these moods.

Referring back to FIG. 1A, as illustrated in block 102, mood effects may include attributes standardized by a virtual world owner or operator. The standardized mood effect attributes may be shared by other avatars in the virtual world. As described herein, the standardized moods or mood effect attributes may be stored on a system or server to permit the mood effect attributes to be shared or associated with other avatars. In accordance with an embodiment of the present invention, users or participants in the virtual system may query or request the mood effect attributes of another avatar. Responses to such queries or requests may assist in automated responses and provide a better understanding of the person or avatar with which a user's avatar may be engaged in the virtual world and to facilitate interactions between users and users' avatars in the virtual world.

In block 104, a profile defining each mood or mood effect may be received by a virtual world system or stored on a user's computer system for automatically managing and presenting mood effects. An identification or characterization of the mood effect may be associated with each profile, such as happy, sad, angry or similar moods or emotions. As previously discussed the profiles can be relatively complex and may include different human moods and emotions and may include different levels for each mood or emotion.

In block 106, any scripts, gestures, actions, or appearances of an avatar, or other attributes may be received and stored by a system to be associated with each mood effect as part of the mood effect profile to define the mood effect. As previously discussed, the GUI 200 presented to define each mood effect or mood effect profile in block 102 may permit an appearance of a user's avatar to be associated with each mood effect. For example, clothing worn by the user's avatar may be different depending upon a mood of the user's avatar. The GUI 200 may permit a script to be entered and stored in association with each mood effect. The GUI may also permit a gesture or action to be entered and stored in association with each mood effect. The mood effects profile and associated attributes may be stored on a system or server in association with the virtual system, such as the server 724 in FIG. 7 or may be stored on a user's computer system 706 or elsewhere on a network 728.

Figure 3:
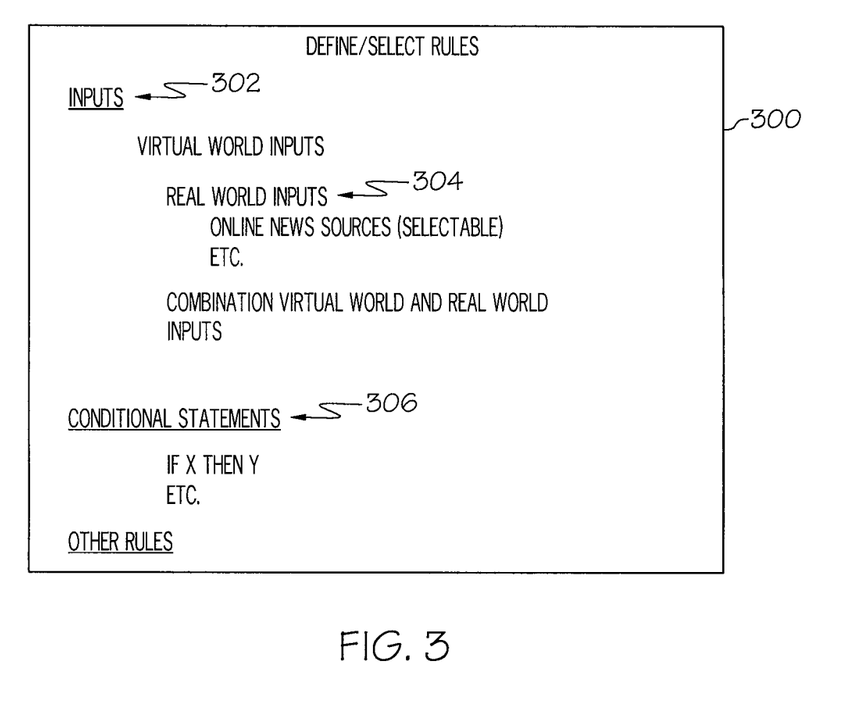
FIG. 3 is an example of a graphical user interface for defining, selecting, or editing rules for automated application of avatar mood effects in a virtual world in accordance with an embodiment of the present invention.

In block 108, another GUI may be presented to a user for defining rules for automatic application of mood effects to the user's avatar and for automated changing of mood effects in the virtual world both with minimal or no user intervention. Referring also to FIG. 3, FIG. 3 is an example of a GUI 300 for defining, selecting or editing rules for automated application of avatar mood effects in a virtual world in accordance with an embodiment of the present invention. Inputs 302 may be selected or defined for use in determining what mood effect to automatically apply or when to change a mood effect. Examples may include virtual world inputs, real world inputs or a combination of virtual world and real world inputs. The inputs may be events or other occurrences in the virtual world or real world. Accordingly, a particular mood effect may be triggered by occurrence of a predetermined event or type of event in the virtual world or real world or combination of the virtual world and real world. Virtual world inputs may also include actions of other avatars in the virtual world. For example, a particular mood effect or action may be performed by a user's avatar in response to a predetermined action by another user's avatar.

The real world inputs 304 may be linked to online news sources, data sources, or the like. A user may be able to select from a menu of possible online news sources or other real world inputs from which data may be received for automated control of avatar mood effects in the virtual world.

The GUI 300 may also permit conditional statements 306 or the like to be selected or defined for automatic application of avatar mood effects. For example, if a certain predetermined condition, event or the like occurs in the virtual world, real world or combination thereof, an associated mood effect may be automatically applied to the user's avatar. Other types of rules or mechanisms for automatic application of avatar mood effects based on predefined inputs may also be defined, selected or edited using GUI 300.

Figure 4:
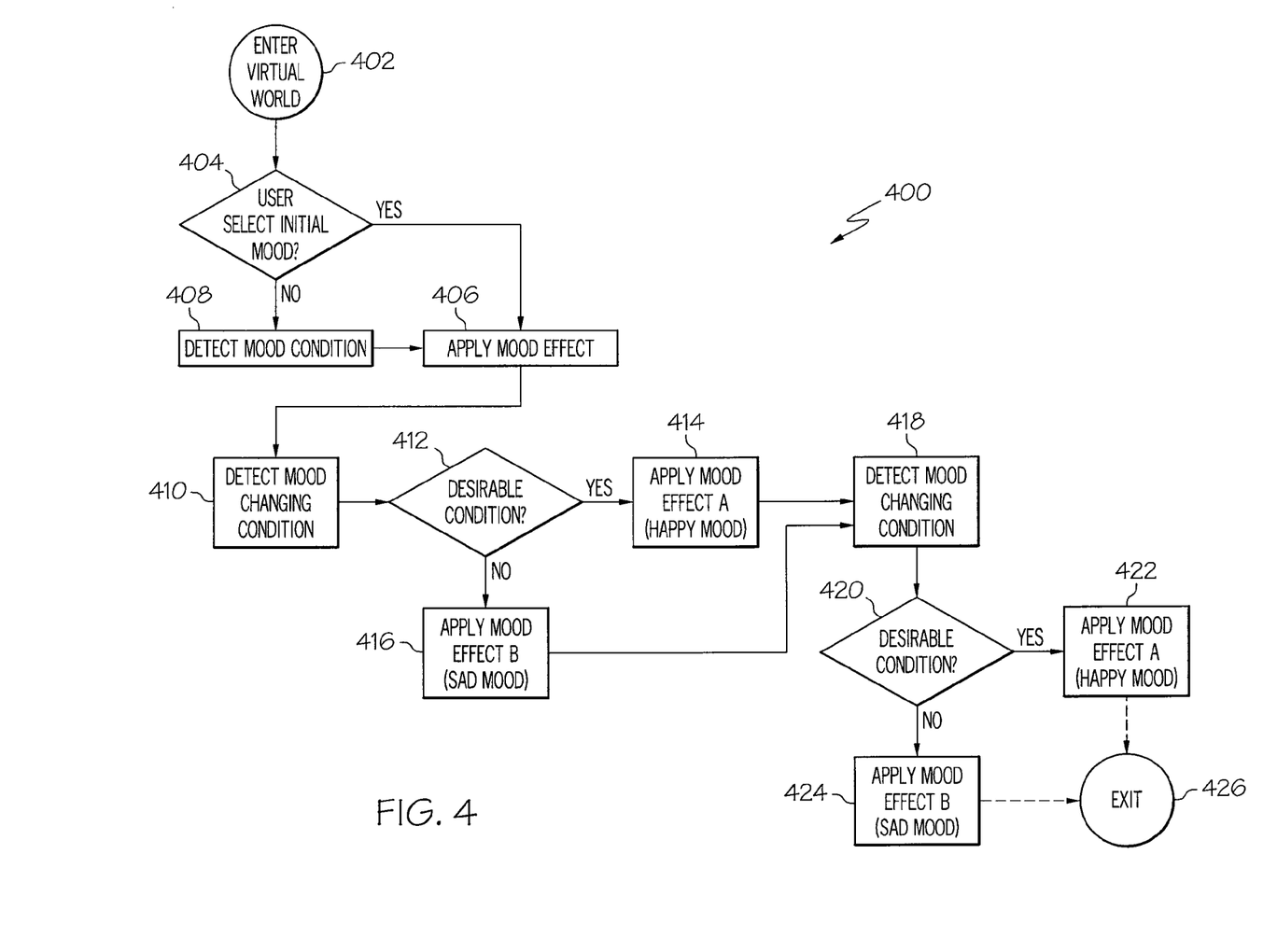
FIG. 4 is an example of a flow chart or state machine to automatically change avatar mood effects in a virtual world in accordance with an embodiment of the present invention.

As described in more detail with reference to FIG. 4, the rules for automatic application of mood effects may create a programmed state machine or machines for the automated application of mood effects.

Referring back to FIG. 1A, in block 110, the rules for automatic application of mood effects, changing mood effects or the like may be received and stored. The rules may be stored on a system or server in association with the virtual system, such as the server 724 in FIG. 7 or may be stored on a user's computer system 706 or elsewhere on a network 728.

In block 112, an initial mood effect may be applied to a user's avatar upon entering the virtual world. The initial mood effect may be selected by the user or the system may select the mood effect based on current conditions, inputs and/or other stimuli. The system may select the mood effect to be applied using the predefined rules defined in block 108.

In block 114, occurrence of a mood changing condition relatable to a user or a user's avatar or both may be detected. For example, occurrence of a type of predetermined event or condition in the virtual world, real world or combination of both is detected.

In block 116, an avatar mood effect may be determined from a plurality of predefined avatar mood effects. The predefined avatar mood effect to be applied to the user's avatar in the virtual world may be based on the detected mood changing condition and by applying any rules that may be associated with the particular condition or type of condition.

In block 118, the mood effect based on the detected condition and rules may be automatically applied to the user's avatar or automatically changed from a previous or exiting avatar mood effect with minimal or no interaction or input from the user. As previously discussed the application of the predefined rules may be performed by a programmed state machine to detect occurrence of a mood-changing condition related to the user's avatar, to determine an appropriate avatar mood effect to be applied from a plurality of predefined avatar mood effects and to automatically apply or change the mood effect based on the rules. Referring also to FIG. 4, FIG. 4 is a flow chart of an example of a method or example of a state machine 400 to automatically change avatar mood effects in a virtual world in accordance with an embodiment of the present invention. At node 402, the user's avatar enters the virtual world. In block 404 a determination may be made whether the user selected an initial mood effect for his avatar. If the user did select an initial mood effect, either from a dropdown list, menu or other means presented to the user upon entering the virtual world, the state machine 400 or method may advance to block 406. In block 406 the mood effect is applied.

If the user did not select an initial mood effect in block 404, the method or state machine 400 may advance to block 408. In block 408, a mood condition may be detected. The mood condition may be detected by determining and analyzing inputs from the virtual world, real world, a combination thereof or other inputs similar to that previously described. Based on the detected mood condition, the appropriate mood effect is applied to the user's avatar in block 406 with minimal or no interaction or input from the user. In accordance with an embodiment of the present invention, the detected mood effect may be automatically applied to the user's avatar based on the detected mood condition. The user may then be offered an option to override the mood effect.

In block 410, a mood changing condition may be detected by sensing the inputs from the virtual world, real world, combination thereof or other inputs as may be defined by the user, system, or virtual world operator or owner similar to that previously described.

In block 412, a nature of the condition may be determined. For example, is the condition one that is a desirable condition relative to the user and/or the user's avatar? If the condition is a desirable condition, an appropriate mood effect is applied in block 414. For example mood effect A or a happy mood effect may be applied to the user's avatar if the detected condition and applicable rules call for a happy mood effect. If the condition in block 412 is determined to not be a desirable condition relative to the user and/or the user's avatar, another mood effect is applied in block 416. For example, mood effect B or a sad mood effect may be applied to the user's avatar if the detected condition and applicable rules call for a sad mood effect.

In block 418, another mood changing condition may be detected similar to that previously described. In block 420 a determination may be made whether or not the mood changing condition is a desirable mood changing condition relative to the avatar, user or both. If the mood changing condition is a desirable condition, mood effect A or the happy mood effect may be applied in block 422. If the mood changing condition is not a desirable condition in block 420, mood effect B or the sad mood effect is applied in block 424. The method or state machine 400 may continue to operate in this fashion, detecting subsequent mood changing conditions and applying the appropriate mood effect based on the detected condition and application rules, until the user's avatar exits the virtual world at node 426.

A relatively simple state machine is described with reference to FIG. 4 for purposes of illustration and simplicity in describing an embodiment of the invention. Similar state machines may be used that involve detecting conditions for changing from one type of mood effect to another and for applying the appropriate mood effect based on the change in mood effect condition detected.

Referring back to FIG. 1B, in block 120, an indication of the mood or mood effect may be presented to other users in the virtual world. The mood effect may be presented in response to a predetermined virtual world event. Examples of the predetermined virtual world event may include the user's avatar entering a predetermined location, or other stimuli. As previously discussed, a user may be asked for his avatar's mood in response to entering the virtual world. In another embodiment, the avatar's mood or mood effect may be applied based on current conditions in the virtual world, real world, combination thereof and/or other factors upon entering the virtual world. Other users may also submit queries to determine a mood of other avatars and/or to obtain more detailed information about the other avatar's mood and possible reasons for the other avatar's mood. The information may be presented to the user in response to the query. This may provide better understanding of the person or avatar with whom the user is engaging in the virtual world. In accordance with another embodiment of the present invention, the mood effect may be manually set based on inputs from the user or selection of criteria by the user.

Figure 5:
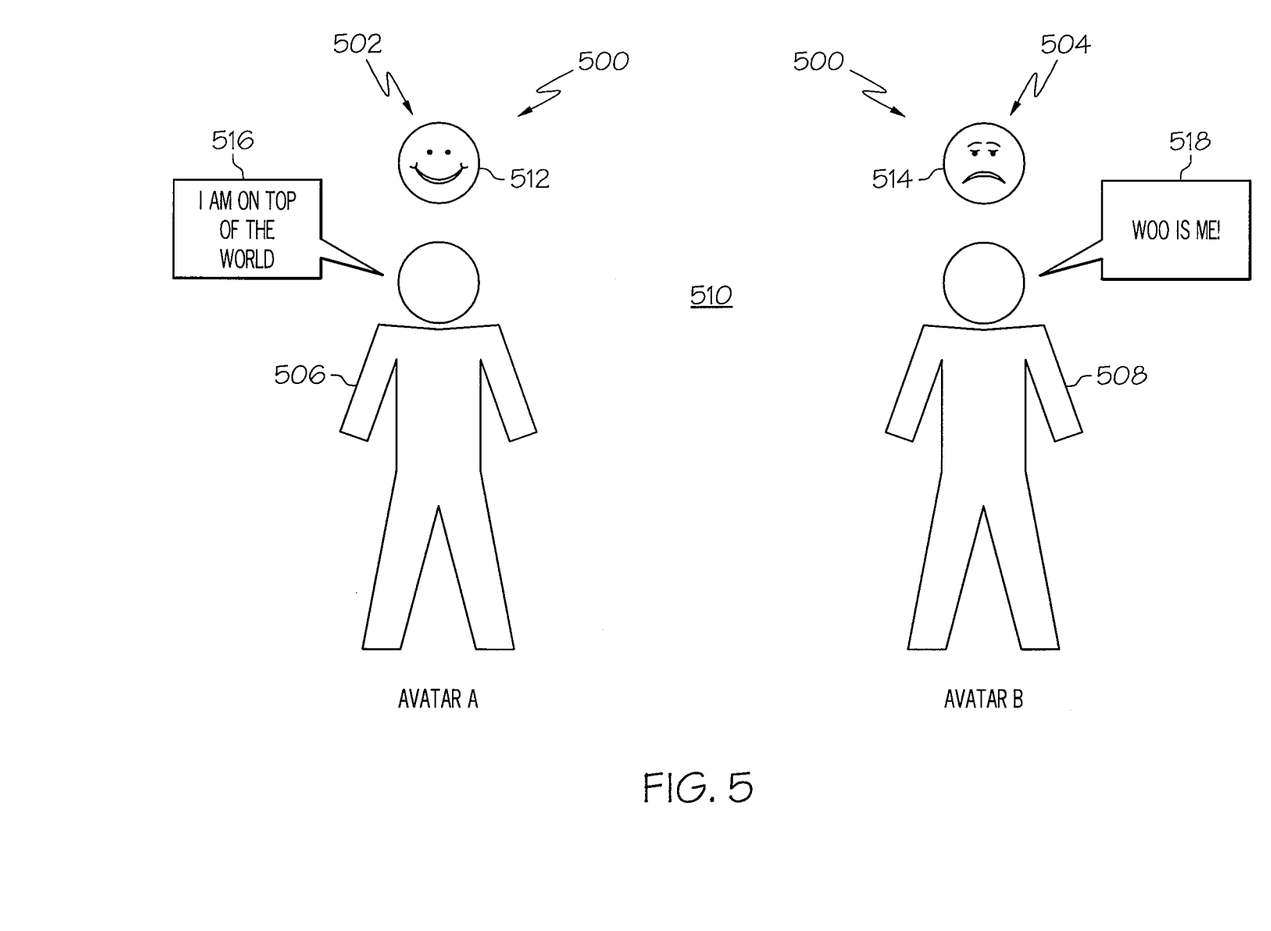
FIG. 5 is an illustration of a tagging mechanism or visual identifier to present a mood effect of a user's avatar in the virtual world in accordance with an embodiment of the present invention.

The mood effect may be tagged to the avatar by a tagging mechanism or visual identifier to present the mood or mood effect of the user's avatar to users of other avatars in the virtual world. Referring also to FIG. 5, FIG. 5 is an illustration of a tagging mechanism 500 or visual identifier to present a mood effect 502 or 504 of a user's avatar 506 or 508 in the virtual world 510 in accordance with an embodiment of the present invention. As illustrated in FIG. 5, a tag such as a smiley face 512 may represent a happy mood effect 502 and a frown 514 may represent a sad mood effect 504. As previously discussed, a script, such as scripts 516 and 518 may also be used to represent the mood or mood effect, either alone or in addition to any other representations or expressions of an avatar's mood or mood effects. Each of the scripts 516 and 518 may be visually presented in a balloon or similar means, as illustrated in FIG. 5, or the script 516 or 518 may be audibly presented and actually spoken by the corresponding avatar via speakers of a computer system, or the scripts 516 and 518 may be both visually and audibly presented. The avatar's mood may be presented to the other users in response to the avatars coming within a predetermined proximity range of one another within the virtual world.

In block 122, a user may be permitted to override a mood effect automatically applied to the user's avatar as described above. The user may be presented an option to input or select another mood effect. In another embodiment, the user may perform a predetermined action, such as clicking-on an icon, to present a menu or dropdown list for selection of options such as overriding the mood effect and/or selecting another mood effect from a plurality of predefined mood effects.

In block 124, changes in mood effects may be mined or recorded and tracked along with any actions taken by avatars in response to a mood effect or change in mood effect. This data may be analyzed by the virtual world owner or operator or other entities providing services in the virtual world for market data intelligence or for other purposes.

Figure 6:
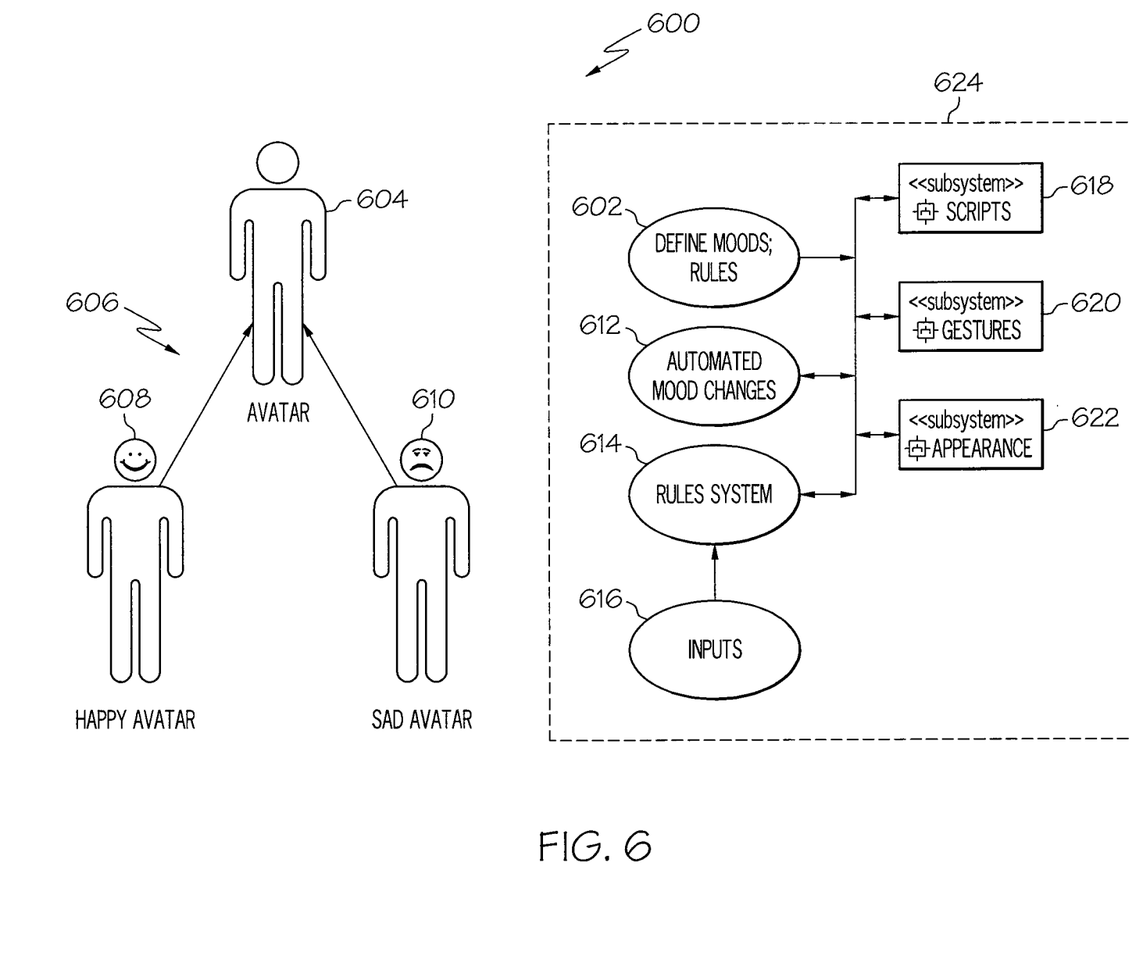
FIG. 6 is a diagram of an example of a system for defining, automatically changing avatar mood effects and presenting mood effects in a virtual world in accordance with an embodiment of the present invention.

FIG. 6 is an example of a diagram of a system 600 for defining, managing, automatically applying and presenting mood effects in a virtual world in accordance with an embodiment of the present invention. The method 100 may be embodied in and performed by the system 600. The system 600 may include a component 602 or module to define moods and rules for automated avatar mood effects. The component 602 allows a user or someone else, such as a virtual world operator and/or owner, to define a mood or plurality of moods or mood effects that may be associated or tagged to a user's avatar 604 and rules or conditions for automatic application of a particular mood or mood effect to the user's avatar in the virtual world 606. Similar to that previously discussed standardized mood or mood effects may be defined by a virtual world owner or operator that may be shared and tagged to avatars of other users in the virtual world.

The moods or mood effects can be defined as simple profiles, such as a "Happy Avatar" 608 and a "Sad Avatar" 610, either of which may be associated with, or tagged to the user's avatar 604 to identify the avatar's mood, visually, audibly or both, to other users in the virtual world 606. The avatar mood or mood effect may be tagged to the avatar 604 using a tagging mechanism, visual identifier or other mechanism. The tagging mechanism or visual identifier may be any such mechanism used in virtual worlds or simulations to associate information or attributes to an avatar and to present such information to other users or participants in the virtual world.

The system 600 may also include an automated mood changes component 612 or module to cause automated changes in moods or mood effects associated with or tagged to an avatar based on a predetermined set of rules and any detected condition or change in conditions in the virtual world, real world, combination of both or other factors.

The system 600 may also include a rules system 614 for determining or detecting when a mood changing condition relatable to a user's avatar occurs. The rules system 614 may also determine an avatar mood effect from a plurality of predefined avatar mood effect to be applied to the user's avatar in the virtual world based on the detected mood changing condition. The automated mood changes component 612 may then automatically apply the determined avatar mood effect to the user's avatar in response to detecting occurrence of the mood changing condition and determining the applicable mood effect to be applied based on the detected mood changing condition.

The rules system 614 may receive inputs 616 to detect occurrence of the mood changing condition and to determine the avatar mood effect to be applied from the plurality of predefined avatar mood effects. Similar to that previously described, examples of the inputs 616 may be data related to occurrences in the virtual world, real world, combinations thereof or other factors.

The system 600 may also include subsystems for defining the mood and changes in the mood or mood effects. For example, the system 600 may include a scripts subsystem 618, a gesture or action subsystem 620, and an appearance subsystem 622. The scripts subsystem 618 may permit a script to be entered and associated with a mood or mood effect in defining the mood or mood effect. The scripts subsystem 618 may also control presentation of the script in association with an avatar tagged with the mood corresponding to the script. The script may be words, sounds, such as grunts, groans, laugh or other utterances which may be spoken or expressed by an avatar that has been tagged with the particular mood or mood effect. The script may be presented in visual or audible form. For example, the script may be presented in a balloon, similar to balloons 516 and 518 illustrated in FIG. 5 or the script may actually be spoken by the avatar and presented through speakers of a user's computer system.

The gestures or actions subsystem 620 may permit a specific gesture or action to be entered and associated with a mood or mood effect in defining the mood or mood effect. The gestures subsystem 620 may also control performance of the gesture or action by an avatar tagged with the mood corresponding to the gesture or action. Examples of avatar actions or gestures that may be associated with a mood or mood effect may include the avatar's head being down and/or shoulders slumped forward to indicate a sad mood, clenched fists to indicate an angry mood, arms held overhead to indicate a happy mood, the avatar jumping up and down to express a happy mood, other movements of the arms, legs or other body parts or body language that may connote a particular mood or emotion or any other actions or gestures that may express a particular type of mood or emotion.

The appearance subsystem 622 may permit a specific appearance of an avatar to be entered and associated with a mood or mood effect in defining the mood or mood effect. The appearance subsystem 622 may also control the appearance of an avatar tagged with the particular mood corresponding to the appearance. Examples of avatar appearances that may express a mood or emotion may include avatar facial expressions, bright colored clothing to express a happy mood, dark, black or gray colored clothing in association with a sad mood or any other visual effects associated with appearance of an avatar in the virtual world that may suggest a mood of the avatar or user associated with the avatar.

The components or modules 602, 612 and 614 and subsystems 618, 620 and 622 may be operable on a computer system 624. The computer system 624 may be server for access by multiple users or may be a computer system associated with a user.

Figure 7:
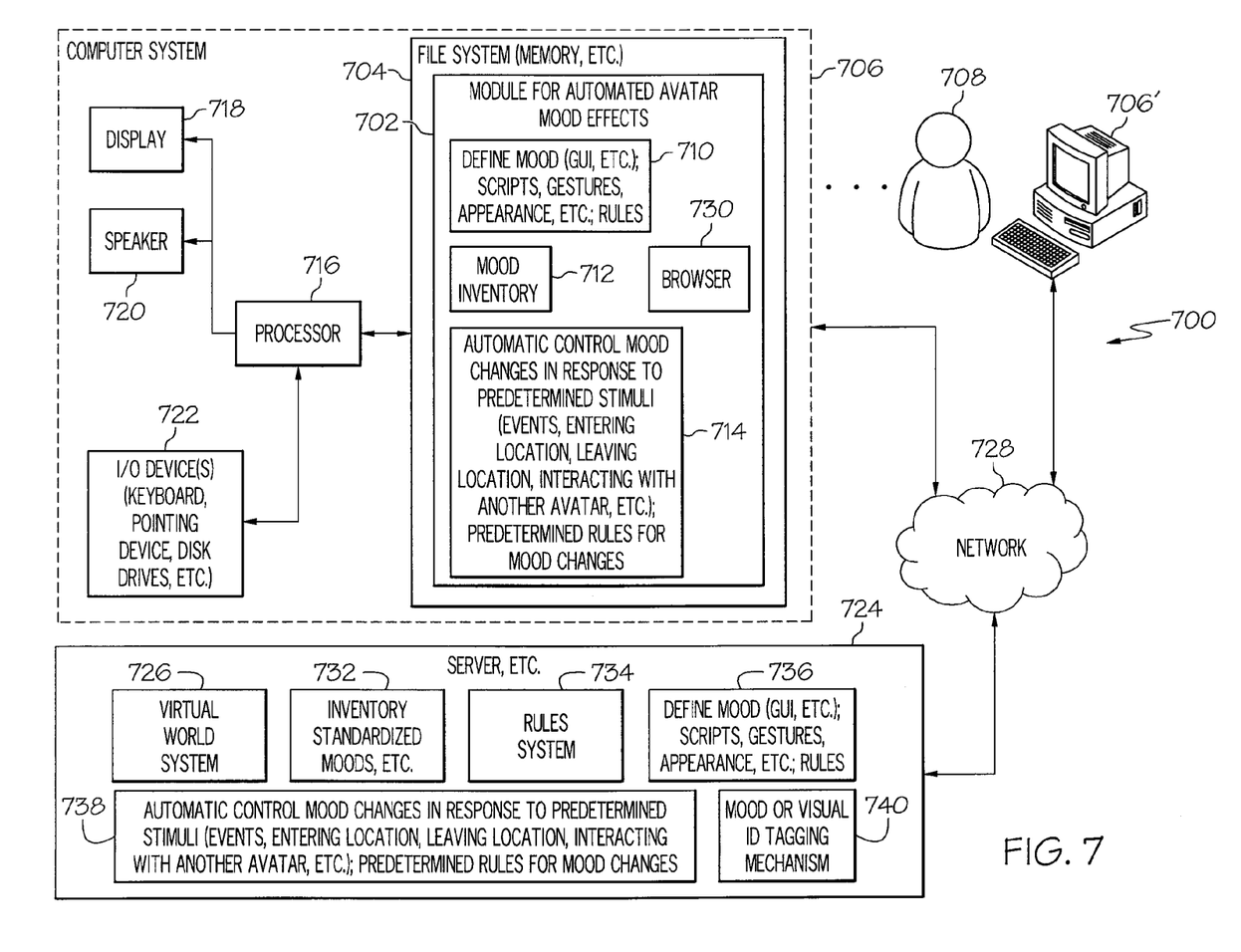
FIG. 7 is a block schematic diagram of an example of a system for automated avatar mood effects in a virtual world in accordance with an embodiment of the present invention.

FIG. 7 is a block schematic diagram of another example of a system 700 for managing, automatically applying and presenting mood effects in a virtual world in accordance with an embodiment of the present invention. The method 100 of FIG. 1 may be embodied in or performed by the system 700. The system 700 may include a module 702 for automated avatar mood effects or automatically managing, applying, and presenting moods or mood effects. The module 702 may be stored on a file system 704 of an exemplary computer system 706. The exemplary computer system 706 may be used by a user, such as user 708, to access or enter a virtual world as described herein. A plurality of users 708 may each use a computer system, similar to the exemplary computer system 706, to participate in the virtual world by controlling an avatar in the virtual world associated with the user 708.

The module 702 for automated avatar mood effects in the virtual world may include a define mood and rules sub-module or component 710. The define mood and rules component 710 may be similar to the define mood and rules component 602 described with reference to FIG. 6. The define mood and rules component 710 may generate and present a GUI to the user 608 to permit a plurality of mood or mood effects to be defined or selected by the user and associated with the user's avatar. The GUI may include provisions for entering or defining scripts, gestures, avatar appearance or similar attributes that may connote the mood of a user's avatar to other users in the virtual world. The GUI for defining or selecting mood effects may be similar to the GUI 200 described with reference to FIG. 2. The define mood and rules component 710 may also present a GUI for defining or selecting rules for automatically applying mood effects to the user's avatar. The GUI for defining or selecting rules for automatically applying mood effects may be similar to GUI 300 described with reference to FIG. 3. As previously described, the mood of a user's avatar may be presented to another user's avatar in response to the avatars coming within a predetermined proximity range of one another. In accordance with another embodiment of the present invention, the mood of a user's avatar may be presented to another user in response to the other user querying the mood of the user's avatar in the virtual world. The querying operation may be performed by activating or selecting the feature in a menu or other means commonly known for selecting features in virtual worlds or computing technology.

In accordance with another embodiment of the present invention, as previously described, moods or mood effects may be standardized by the virtual world owner and/or operator. Accordingly, the virtual world owner/operator may define the different mood or mood effects. The different predefined mood or mood effects may then be shared by all of the users of the virtual world and may be associated with or tagged to respective users' avatars to express or present the avatar's mood to other users in the virtual world.

The module for automated avatar mood effects 702 may also include a mood inventory 712. The mood inventory 712 may store all of the moods and associated mood effects or attributes, such as scripts, gestures or actions, appearances or other attributes associated with each mood for application to the user's avatar. As previously discussed, the moods and associated mood effects or attributes may be defined by the user or the virtual world owner and/or operator may define standardized moods and associated mood effects or attributes which may be shared among all avatars in the virtual world.

The module for automated avatar mood effects in a virtual world may also include a component or module 714 for automatic control of mood changes in response to predetermined stimuli. For example, mood changes may occur in response to selection of another mood by the user of the avatar, certain events in the virtual world or real world, entering or leaving a location in the virtual world, interaction with another avatar or any other stimuli that may elicit a mood change. As previously discussed, predetermined rules may be created or defined to evoke specific mood changes.

The computer system 706 may also include a processor 716. The module for automated avatar mood effects 702 may be accessed from the file system 704 and run on the processor 716.

The computer system may also include a display 718, a speaker system 720, and one or more input devices, output devices or combination input/output devices, collectively I/O devices 722. The I/O devices 722 may include a keyboard, pointing device, such as a mouse, disk drives and any other devices to permit a user to interface with and control operation of the computer system and to access and participate in the virtual world through the user's avatar. The display 718 may present the user's avatar and other users' avatars in the virtual world and present the features described herein for defining and managing moods or mood effects. The speaker 720 may present any sounds associated with the virtual world, such as audible mood effects or other sounds.

The system 700 may also include a server 724. A virtual world system 726 may reside and operate on the server 724. Each user 708 may access the virtual world system 726 via a network 728 using a browser 730 on their respective computer systems 706. The network 728 may be the Internet, an intranet or other private or proprietary network.

Other embodiments of the present invention are not limited to only a server and the system and features described herein may be in one of many forms. Examples may include may include a client, configurations that support peer-to-peer communications, a wireless solution or other arrangements.

In accordance with an embodiment of the present invention, a repository or inventory 732 of standardized moods, mood effects and any associated attributes may be associated with the server 724. The standardized mood inventory 732 may be contained on the server 724 or may be a separate component from the server 728. The standardized mood inventor 732 may be in addition to the mood inventor 712 on the user's computer system 706 or the system 700 may only include the mood inventory 712 on each user's computer system 706 or only the standardized mood inventory 732.

A rules system 734 for storing and applying rules for automatically applying and changing avatar mood effects as described herein may also reside and operate on the server 724. While the rules system 734 is shown in FIG. 7 as residing and operating on the server 724, rules for automatically applying and changing avatar mood effects may also reside and operate on each user's computer system 706 rather than or the server 724. In another embodiment, some rules may reside and operate on the server 724 and other rules may reside and operate on each user's computer system 706.

The server 724 may also include a module 736 for defining mood effect profiles including attributes such as scripts, gestures, appearances, and other attributes. The module 736 may generate one or more GUI's similar to those described herein for defining avatar mood effects. The module 736 may also generate one or more GUI's for defining rules for automatic application and changing of avatar mood effects. The module 736 may be in addition to the module 710 on the user's computer system 706 for defining mood effects and application rules or the module 736 on the server 724 may be in lieu of the module 710 on each user's computer system 706. In this way, computer resources and storage capacity may be saved on each user's computer system 706 and the virtual world operator and/or owner may have more control over the automated application and changing of avatar mood effects.

A module 738 for automatic control of mood changes in response to predetermined stimuli and use or application of predetermined rules as described herein may also reside and operate on the server 724. The module 738 may operate in conjunction with the module 714 operating on each user's computer system 706 or the system 700 may include only the module 738 or only the module 714.

A mood or visual identification tagging mechanism 740 may also be operable on the server 724 to tag mood effects to respective avatars and to control and maintain any mood changes. Control, tracking and recording of moods and mood changes may be coordinated between the automatic mood change module 738 and/or module 714 that may be operable on the computer system 706 of each user 708 and the mood or visual identification tagging mechanism 740. In accordance with an embodiment of the present invention, the module 738 for automatically managing and presenting avatar mood effects may be operable on the server 724 or some of the features or operations described with respect to module 738 may be performed in the computer system 706 and others on the server 724.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for automated avatar mood effects in a virtual world, comprising:
   detecting occurrence of a mood changing condition relatable to a user's avatar;
   determining an avatar mood effect from the plurality of predefined avatar mood effects to be applied to the user's avatar in the virtual world based on the detected mood changing condition;
   automatically applying the avatar mood effect to the user's avatar in the virtual world in response to detecting occurrence of the mood changing condition and determining an applicable avatar mood effect based on the detected mood changing condition; and
   presenting the automatically applied avatar mood effect in association with the user's avatar in the virtual world, wherein presenting the automatically applied avatar mood effect comprises presenting a predefined script spoken by the user's avatar in at least one of a visual form and an audible form and presenting different colored clothing worn by the user's avatar depending on the avatar mood effect applied, bright colored clothing worn by the user's avatar expressing a happy mood and dark, black or gray colored clothing worn by the user's avatar expressing a sad mood.

2. The method of claim 1, wherein detecting occurrence of a mood changing condition comprises at least one of:
   detecting occurrence of the mood changing condition in the virtual world;
   detecting occurrence of the mood changing condition outside of the virtual world; and detecting occurrence of the mood changing condition in a combination of the virtual world and outside of the virtual world.

3. The method of claim 1, further comprising receiving data from a real world source to determine occurrence of a mood changing condition in the real world.

4. The method of claim 1, further comprising using a rule to determine when a mood changing condition occurs and which of the plurality of predefined avatar mood effects is to be automatically applied to the user's avatar.

5. The method of claim 1, further comprising allowing the user to override the avatar mood effect automatically applied to the user's avatar.

6. The method of claim 1, further comprising allowing the user to select another mood effect to override the automatically applied avatar mood effect.

7. The method of claim 1, further comprising using a programmed state machine for interaction between the virtual world and the real world for automatically applying the avatar mood effect to the user's avatar.

8. The method of claim 1, further comprising presenting an interface for defining rules for automatically applying the avatar mood effects and for transitioning from one avatar mood effect to another.

9. The method of claim 8, wherein presenting the interface for defining rules for automatically applying the avatar mood effects comprises:
   allowing selection of at least one input for detecting occurrence of the mood changing condition; and
   allowing creation of a conditional statement for automatically applying the avatar mood effect based on the detected mood changing condition.

10. The method of claim 1, further comprising presenting at least one of a visual indicator and an audible indicator associated with the user's avatar to other users in the virtual world in response to the avatar mood effect being automatically applied to the user's avatar.

11. The method of claim 1, further comprising automatically changing the avatar mood effect presentable to other users in the virtual world in response to detecting occurrence of another mood changing condition.

12. The method of claim 1, further comprising at least one of presenting the predefined script in association with the user's avatar to other users in the virtual world to indicate the automatically applied avatar mood effect of the user's avatar in the virtual world, the user's avatar performing a predefined action to indicate the automatically applied avatar mood effect of the user's avatar in the virtual world, and the user's avatar having a predetermined appearance in the virtual world to indicate the automatically applied mood of the user's avatar.

13. The method of claim 1, further comprising:
standardizing the plurality of mood effects as avatar mood effect attributes within the virtual world; and
permitting the mood effect attributes to be shared by other avatars in the virtual world.

14. The method of claim 1, further comprising permitting a query by another user to determine the mood effect of the user's avatar to assist the other user in interacting within the virtual world.

15. The method of claim 1, further comprising allowing mining of mood effect changes and any actions taken by the user's avatar while in a particular mood effect.

16. A system for automated avatar mood effects in a virtual world, comprising:
a processor device;
a module operable on the processor device for automated avatar mood effects, wherein the module comprises:
a unit to detect occurrence of a mood changing condition relatable to a user's avatar;
a unit to determine an avatar mood effect from the plurality of predefined avatar mood effects to be applied to the user's avatar in the virtual world based on the detected mood changing condition;
a unit to automatically apply the avatar mood effect to the user's avatar in the virtual world in response to detecting occurrence of the mood changing condition and determining an applicable avatar mood effect based on the detected mood changing condition; and
a unit to present the automatically applied avatar mood effect in association with the user's avatar in the virtual world, wherein the unit to present the automatically applied avatar mood effect comprises a module to present a predefined script spoken by the user's avatar in at least one of a visual form and an audible form and presenting different colored clothing worn by the user's avatar depending on the avatar mood effect applied, bright colored clothing worn by the user's avatar expressing a happy mood and dark, black or gray colored clothing worn by the user's avatar expressing a sad mood.

17. A computer program product for automated avatar mood effects in a virtual world, comprising:
a non-transitory computer usable storage medium having computer usable program code embodied therein, the computer usable medium comprising:
computer usable program code configured to detect occurrence of a mood changing condition relatable to a user's avatar;
computer usable program code configured to determine an avatar mood effect from the plurality of predefined avatar mood effects to be applied to the user's avatar in the virtual world based on the detected mood changing condition;
computer usable program code configured to automatically apply the avatar mood effect to the user's avatar in the virtual world in response to detecting occurrence of the mood changing condition and determining an applicable avatar mood effect based on the detected mood changing condition; and
computer usable program code configured to present the automatically applied avatar mood effect in association with the user's avatar in the virtual world, wherein the computer usable program code configured to present the automatically applied avatar mood effect comprises computer usable program code configured to present a predefined script spoken by the user's avatar in at least one of a visual form and an audible form and to present different colored clothing worn by the user's avatar depending on the avatar mood effect applied, bright colored clothing worn by the user's avatar expressing a happy mood and dark, black or gray colored clothing worn by the user's avatar expressing a sad mood.

18. The method of claim 1, wherein presenting the predefined script spoken by the user's avatar comprises presenting a balloon extending from a head of the user's avatar, the balloon containing the script spoken by the user's avatar.

19. The method of claim 1, wherein presenting the predefined script spoken by the user's avatar comprises presenting a balloon extending from a head of the user's avatar, the balloon containing the script spoken by the user's avatar, and presenting the predefined script audibly being spoken by the user's avatar through speakers of a computer device.

20. The method of claim 1, further comprising presenting different jewelry worn by the user's avatar depending on the avatar mood effect applied.

* * * * *